United States Patent
Hotta et al.

(10) Patent No.: US 9,086,566 B2
(45) Date of Patent: Jul. 21, 2015

(54) MONOCULAR HEAD MOUNTED DISPLAY

(75) Inventors: Aira Hotta, Kanagawa-ken (JP);
Tsuyoshi Tasaki, Kanagawa-ken (JP);
Masahiro Sekine, Tokyo (JP); Takashi Sasaki, Kanagawa-ken (JP); Haruhiko Okumura, Kanagawa-ken (JP); Akihisa Moriya, Kanagawa-ken (JP); Akira Kinno, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 811 days.

(21) Appl. No.: 13/238,193

(22) Filed: Sep. 21, 2011

(65) Prior Publication Data
US 2012/0242694 A1    Sep. 27, 2012

(30) Foreign Application Priority Data
Mar. 22, 2011 (JP) ................. 2011-063317

(51) Int. Cl.
*G09G 5/00* (2006.01)
*G02B 27/01* (2006.01)
*G06T 11/00* (2006.01)

(52) U.S. Cl.
CPC ............. *G02B 27/01* (2013.01); *G06T 11/00* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 7,952,808 B2 | 5/2011 | Hotta et al. | |
| 2002/0196202 A1* | 12/2002 | Bastian et al. | 345/8 |
| 2003/0210228 A1* | 11/2003 | Ebersole et al. | 345/157 |
| 2005/0071082 A1* | 3/2005 | Ohmura et al. | 701/211 |
| 2010/0198506 A1* | 8/2010 | Neilhouse | 701/208 |
| 2011/0130949 A1* | 6/2011 | Arrasvuori | 701/200 |

FOREIGN PATENT DOCUMENTS

| | | |
|---|---|---|
| JP | 07-228172 | 8/1995 |
| JP | 2003-291688 | 10/2003 |
| JP | 2004-219664 | 8/2004 |
| JP | 2005-069799 | 3/2005 |
| JP | 2005-346177 | 12/2005 |
| JP | 2006-017626 | 1/2006 |

(Continued)

OTHER PUBLICATIONS

Machine Translation for JP 2005-346177 A, 2005.*

(Continued)

*Primary Examiner* — Yingchun He
(74) *Attorney, Agent, or Firm* — Amin, Turocy & Watson, LLP

(57) ABSTRACT

According to one embodiment, a monocular head mounted display comprising an information acquisition section, an image data generation section, and an image display section. The information acquisition section acquires solid body position information on a position of a solid body located on ground around a user, and indication position information on an indication position for the user. The image data generation section generates image data including an information object to provide provision information to the user. The image display section displays an image based on the image data on one eye of the user in superimposition on a real scene. The image data generation section generates the image data so as to move the information object in the image so that the information object is superimposed on the indication position after placing the information object in the image so that the information object is superimposed on the solid body.

19 Claims, 10 Drawing Sheets

(56) References Cited

FOREIGN PATENT DOCUMENTS

| | | |
|---|---|---|
| JP | 2006-284458 | 10/2006 |
| JP | 2008-230296 | 10/2008 |
| JP | 2009-128565 | 6/2009 |
| JP | 2010-221830 | 10/2010 |
| WO | WO 2011015843 A2 * | 2/2011 |

OTHER PUBLICATIONS

Japanese Office Action for Japanese Application No. 2011-063317 mailed on Apr. 12, 2013, 8 pages.

Japanese Office Action for Japanese Application No. 2011-063317 mailed on Jan. 30, 2013.

* cited by examiner

MONOCULAR HEAD MOUNTED DISPLAY

CROSS-REFERENCE TO RELATED APPLICATIONS

This application is based upon and claims the benefit of priority from the prior Japanese Patent Application No. 2011-063317, filed on Mar. 22, 2011; the entire contents of which are incorporated herein by reference.

FIELD

Embodiments described herein relate generally to a monocular head mounted display.

BACKGROUND

A head-up display (HUD) is known as e.g. a vehicle mounted display for projecting display information on the windshield so that the external information and the display information are simultaneously viewed. In a binocular HUD, the display image is perceived as a double image, and hence is difficult to see. There is a technique for presenting the display image only to one eye for the purpose of preventing the double image in binocular viewing. There is also a technique for presenting the display image only to one eye for the purpose of causing the depth position of the display image to appear farther than its optical display position.

On the other hand, a head mounted display (HMD) is known. The display unit of the HMD is mounted on the user's head. In a monocular HMD, the depth of the display image is unclear.

BRIEF SUMMARY OF THE INVENTION

Figure 1A:
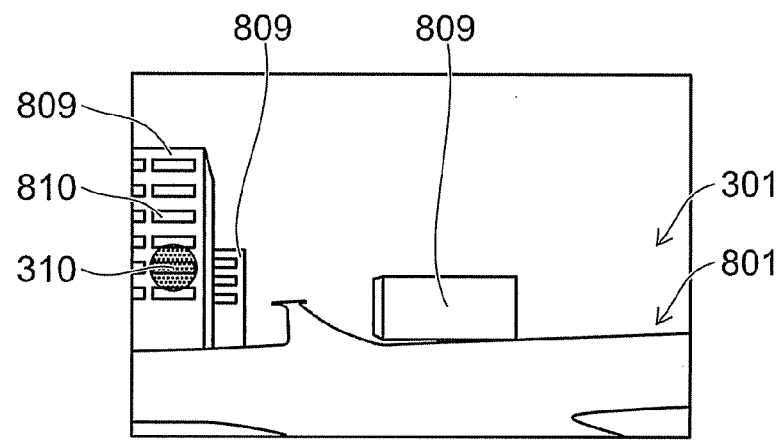
FIGS. 1A to 1C are schematic views illustrating the operation of a monocular head mounted display according to a first embodiment.

In general, according to one embodiment, a monocular head mounted display comprising an information acquisition section, an image data generation section, and an image display section. The information acquisition section is configured to acquire solid body position information on a position of a solid body located on ground around a user, and indication position information on an indication position for the user. The image data generation section is configured to generate image data including an information object to provide provision information to the user. The image display section is configured to display an image based on the image data generated by the image data generation section on one eye of the user in superimposition on a real scene. Based on the solid body position information and the indication position information acquired by the information acquisition section, the image data generation section is configured to generate the image data so as to move the information object in the image so that the information object is superimposed on the indication position after placing the information object in the image so that the information object is superimposed on the solid body.

DETAILED DESCRIPTION

Exemplary embodiments of the invention will now be described in detail with reference to the drawings.

The drawings are schematic or conceptual; and the relationships between the thickness and width of portions, the proportions of sizes among portions, etc., are not necessarily the same as the actual values thereof. Further, the dimensions and proportions may be illustrated differently among the drawings, even for identical portions.

In the specification and the drawings of the application, components similar to those described in regard to a drawing thereinabove are marked with like reference numerals, and a detailed description is omitted as appropriate.

First Embodiment

Figure 1B:
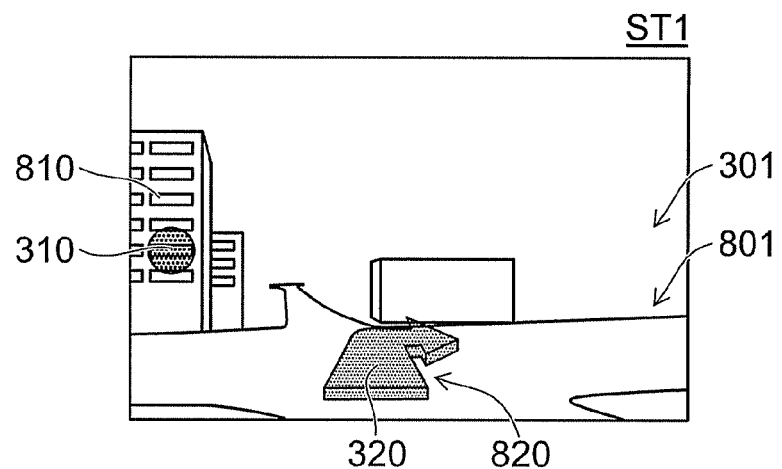
Figure 1C:
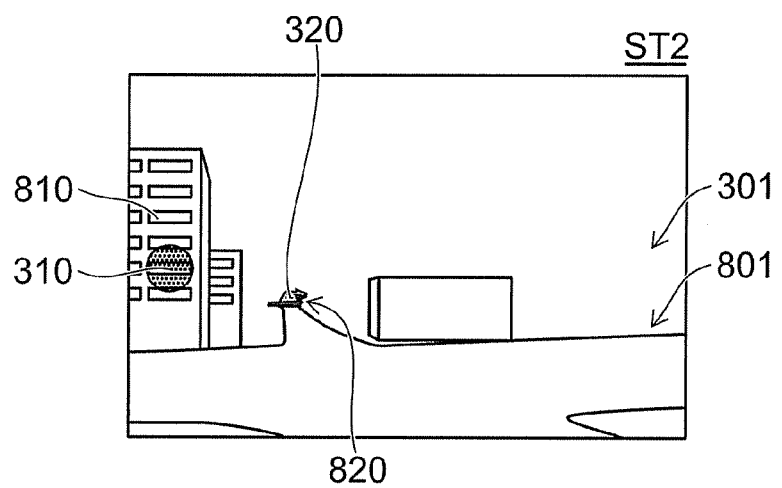

FIGS. 1A to 1C are schematic views illustrating the operation of a monocular head mounted display according to a first embodiment.

Figure 2:
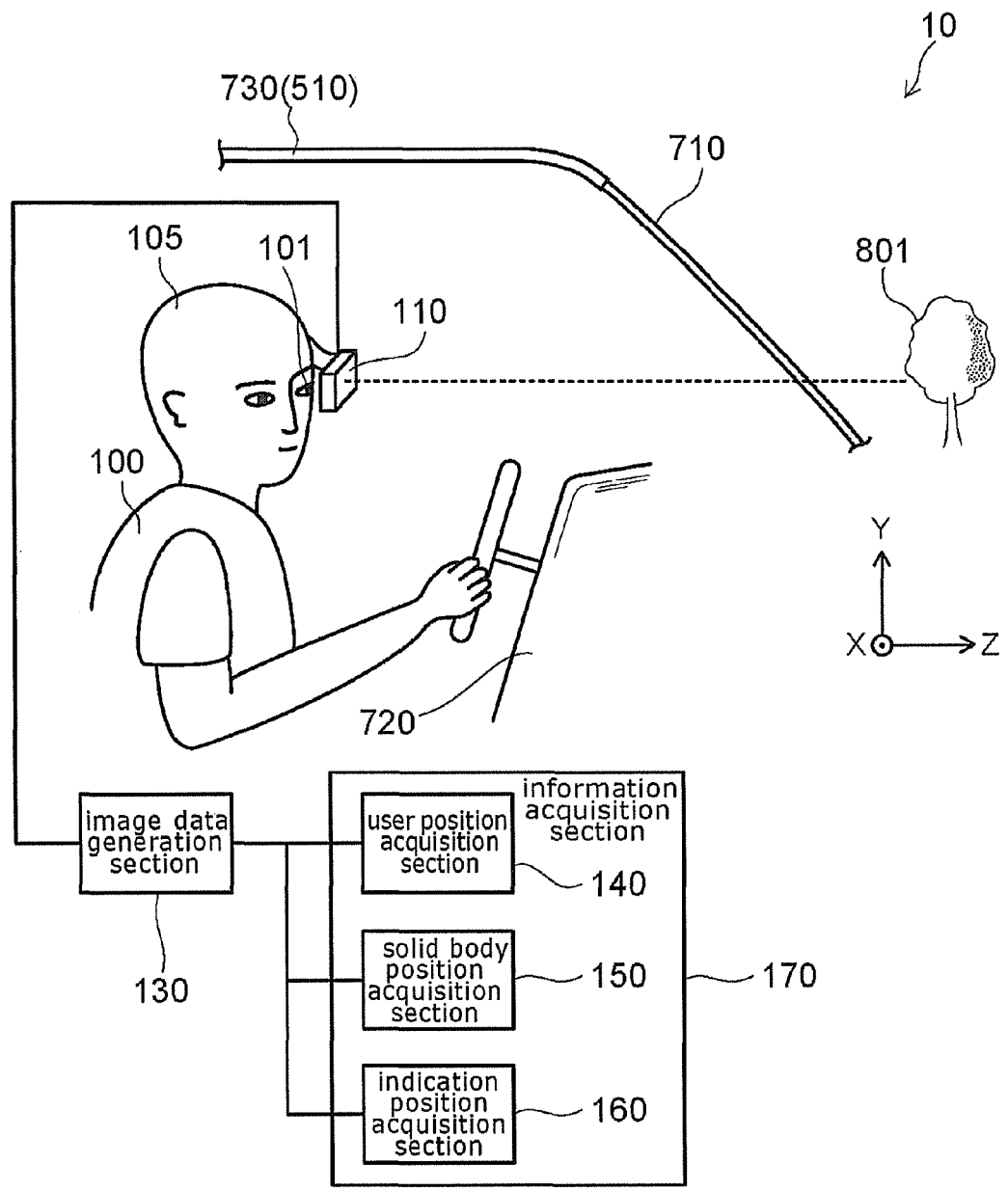
FIG. 2 is a schematic view illustrating the configuration of the monocular head mounted display according to the first embodiment.

FIG. 2 is a schematic view illustrating the configuration of the monocular head mounted display according to the first embodiment.

As shown in FIG. 2, the monocular head mounted display 10 according to this embodiment includes an image display section 110, an image data generation section 130, and an information acquisition section 170. In this example, the information acquisition section 170 includes a user position acquisition section 140, a solid body position acquisition section 150, and an indication position acquisition section 160. The user position acquisition section 140, the solid body position acquisition section 150, and the indication position acquisition section 160 are functional blocks included in the information acquisition section 170. At least two of these position acquisition sections may be integrated with each other.

In the following, it is assumed that the user 100 of the monocular head mounted display 10 is on board a mobile body 510 (e.g., vehicle 730).

The image display section 110 displays an image on one eye 101 of the user 100 in superimposition on the real scene 801. The image display section 110 is mounted on the head 105 of the user 100. The image display section 110 includes e.g. an image display device (not shown) such as an LCD, and a reflector (not shown) for reflecting the light emitted from the image display device so as to be incident on one eye 101. The reflector has reflectivity and transmissivity. The user 100 can simultaneously view the image included in the light reflected by the reflector, and the real scene 801.

The image data generation section 130 generates data of the image displayed in the image display section 110. That is, the image data generation section 130 generates image data including an information object to provide provision information to the user 100. The information object is described later. The image data generation section 130 includes e.g. a calculation device for performing calculation concerning the image. The image data generation section 130 is based on e.g. semiconductor devices. To the image data generation section 130, as necessary, a storage section for storing various data may be attached.

The aforementioned image display section 110 displays an image based on the image data generated by the image data generation section 130 on one eye of the user 100 in superimposition on the real scene.

The user position acquisition section 140 acquires information on the position of the user 100 (user position information). The user position acquisition section 140 acquires user position information obtained by e.g. a GPS system. For instance, a GPS device is mounted on the vehicle 730 and detects the position of the user 100 (vehicle 730). Then, the user position acquisition section 140 acquires user position information on the position of the user 100 from the GPS device. Alternatively, the user position acquisition section 140 may include e.g. a GPS function.

The solid body position acquisition section 150 acquires solid body position information on the position of a solid body located on the ground around the user 100. For instance, the solid body position acquisition section 150 acquires surrounding information on the surroundings of the user 100. The solid body position acquisition section 150 acquires e.g. information on the forward real scene 801 around the user 100. For instance, the information acquisition section 170 acquires solid body position information based on the acquired information on the real scene.

For instance, the solid body position acquisition section 150 can acquire map information including the region around the user 100 as surrounding information. For instance, from a memory, the solid body position acquisition section 150 acquires map information stored in the memory. For instance, the solid body position acquisition section 150 can acquire map information from outside the vehicle 730 through arbitrary communication means. For instance, the solid body position acquisition section 150 may include a memory for storing map information. For instance, the information acquisition section 170 acquires solid body position information based on the acquired map information.

Furthermore, the solid body position acquisition section 150 can acquire information on e.g. a plurality of solid bodies located on the ground around the user 100 as part of the surrounding information. For instance, the solid body position acquisition section 150 acquires three-dimensional picture information stored with the map information. The three-dimensional picture information includes e.g. picture information in the law of perspective for allowing a near solid body to be displayed in a large size and a far solid body to be displayed in a small size. From such three-dimensional picture information, information on e.g. a plurality of solid bodies located on the ground around the user 100 can be acquired.

Furthermore, the solid body position acquisition section 150 can include an imaging function. For instance, the solid body position acquisition section 150 images the surroundings of the user 100. From this imaging data, information on e.g. a plurality of solid bodies located on the ground around the user 100 can be acquired.

The indication position acquisition section 160 acquires indication position information on an indication position for the user 100. The indication position is a position to be recognized by the user 100. Examples of the indication position include the position of an expected location for change of traveling direction, and the position of the location of e.g. a landmark to be referred in traveling.

Thus, the information acquisition section 170 acquires solid body position information on the position of the solid body located on the ground around the user 100, and indication position information on the indication position for the user 100. The former is implemented by e.g. the solid body position acquisition section 150. The latter is implemented by the indication position acquisition section 160. The solid body and the indication position are described later.

The image data generation section 130 and the information acquisition section 170, for instance, are housed inside e.g. the dashboard 720 of the vehicle 730. However, the position where the image data generation section 130 and the information acquisition section 170 are provided is arbitrary.

Here, for convenience of description, the direction from back to front of the user 100 (e.g., the direction from back to front of the vehicle 730) is defined as Z-axis direction. The direction from left to right of the user 100 is defined as X-axis direction. The direction from bottom to top of the user 100 is defined as Y-axis direction.

FIGS. 1A to 1C schematically show the views perceived by the user 100. That is, these figures illustrate the views in which the image 301 displayed by the monocular head mounted display 10 (image display section 110) and the real scene 801 are simultaneously viewed.

The image displayed by the image display section 110 includes a reference object 310 and an information object 320.

FIGS. 1A to 1C illustrate the reference object 310. FIG. 1B further illustrates the information object 320 in the first state described later. FIG. 1C further illustrates the information object 320 in the second state described later.

As shown in FIG. 1A, the reference object 310 is displayed in the image 301 displayed by the image display section 110. The reference object 310 is perceived in superimposition on the real scene 801. The reference object 310 serves as a reference for the depth as viewed from the user 100. In this example, the reference object 310 is shaped like a circle. However, the shape, color and the like of the reference object 310 are arbitrary.

As shown in FIGS. 1B and 1C, the information object 320 is further displayed in the image 301. The information object 320 is perceived in superimposition on the real scene 801. The information object 320 includes provision information provided to the user 100. In this example, the information object 320 is an arrow for indicating the expected direction of travel (traveling direction). The expected direction of travel (traveling direction) corresponds to the direction in which the user 100 is to travel at the current location based on the traveling path determined by e.g. the navigation system. In this example, the information object 320 is shaped like an arrow. However, the shape of the information object 320 can be suitably adapted to the information given to the user 100. That is, in the embodiment, the shape of the information object 320 is arbitrary.

The position of the real scene corresponding to the provided situation to be provided by the information object 320 is an indication position. For instance, in the case where the information object 320 is an arrow for changing the traveling direction, the position in the real scene of the intersection where the traveling direction is to be changed is an indication position.

As shown in FIG. 1A, based on e.g. the acquired surrounding information, the solid body position acquisition section 150 acquires solid body position information on the position of the solid body 809 located on the ground around the user 100. Specifically, from among a plurality of solid bodies 809 located on the ground around the user 100, the solid body position acquisition section 150 selects a reference body 810 serving as a reference for the depth as viewed from the user 100. The reference body 810 is e.g. the wall of a building.

The image data generation section 130 places the reference object 310 in the image 301 in superimposition on the position of the reference body 810 as viewed from the user 100. That is, the image data generation section 130 generates image data on the reference object 310 in superimposition on the position of the reference body 810 as viewed from the user 100.

As shown in FIGS. 1B and 1C, based on the aforementioned surrounding information and the position of the user 100 acquired by the user position acquisition section 140, the image data generation section 130 places the information object 320 in the image 301 in superimposition on the target position 820 of the real scene 801 related to the provision information as viewed from the user 100. That is, the image data generation section 130 generates image data on the information object 320 in superimposition on the target position 820 as viewed from the user 100.

The target position 820 is the position in the real scene 801 where the provision information included in the information object 320 is to be perceived by the user 100. In this example, this target position 820 corresponds to the indication position. For instance, in the case where the information object 320 indicates the traveling direction at a location for change of traveling direction (such as an intersection), the target position 820 is the location for change of traveling direction. By superimposition of the information object 320 on the target position 820, the user 100 can recognize e.g. the location for change of traveling direction and learn which direction to travel at the location.

FIG. 1B illustrates the information object 320 in the first state ST1 in which the target position 820 is nearer than the reference body 810 as viewed from the user 100.

FIG. 1C illustrates the information object 320 in the second state ST2 in which the target position 820 is farther than the reference body 810 as viewed from the user 100.

As illustrated in these figures, the size of the information object 320 in the first state ST1 is different from the size of the information object 320 in the second state ST2. On the other hand, the size of the reference object 310 in the first state ST1 is equal to the size of the reference object 310 in the second state ST2. Thus, the relative relationship between the size of the information object 320 and the size of the reference object 310 is changed between the first state ST1 and the second state ST2.

More specifically, as shown in FIG. 1B, in the first state ST1 in which the target position 820 is nearer than the reference body 810 as viewed from the user 100, the image data generation section 130 makes the size of the information object 320 larger than the size of the reference object 310 in the image 301.

As shown in FIG. 1C, in the second state ST2 in which the target position 820 is farther than the reference body 810 as viewed from the user 100, the image data generation section 130 makes the size of the information object 320 smaller than the size of the reference object 310 in the image 301.

Figure 3:
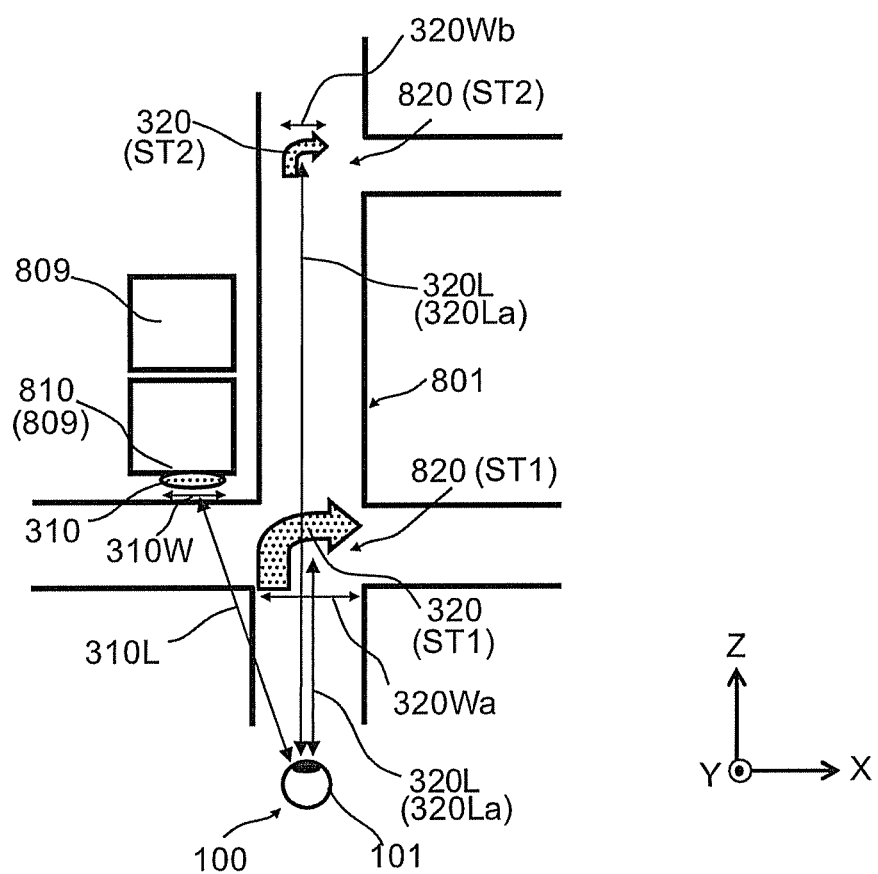
FIG. 3 is a schematic view illustrating the operation of the monocular head mounted display according to the first embodiment.

FIG. 3 is a schematic view illustrating the operation of the monocular head mounted display according to the first embodiment.

FIG. 3 illustrates the positional relationship between the user 100 and the surroundings as viewed from above the user 100. As illustrated in FIG. 3, the real scene 801 includes roads. There are intersections in the roads. The real scene 801 includes a reference body 810 (e.g., the wall of a building) selected from a plurality of solid bodies 809.

As shown in FIG. 3, the distance between the position of the user 100 (e.g., one eye 101) and the reference body 810 is defined as reference body distance 310L. The distance between the position of the user 100 and the target position 820 is defined as target distance 320L.

As shown in FIG. 3, in the first state ST1, the target distance 320L (target distance 320La) is shorter than the reference body distance 310L. In the second state ST2, the target distance 320L (target distance 320Lb) is longer than the reference body distance 310L.

In the first state ST1, the size of the information object 320a is larger than the size of the reference object 310 in the image 301. The size of the reference object 310 is e.g. the width 310W along the X-axis direction of the reference object 310. The size of the information object 320a is e.g. the width 320Wa along the X-axis direction of the information object 320a. In the first state ST1, the width 320Wa of the information object 320a is larger (wider) than the width 310W of the reference object 310. The size of the reference object 310 may be e.g. the width along the Y-axis direction of the reference object 310. The size of the information object 320a may be e.g. the width along the Y-axis direction of the information object 320a. For instance, the width along the Y-axis direction of the information object 320a is made larger than the width along the Y-axis direction of the reference object 310.

In the second state ST2, the size of the information object 320b is smaller than the size of the reference object 310 in the image 301. The size of the information object 320b is e.g. the width 320Wb along the X-axis direction of the information object 320b. In the second state ST2, the width 320Wb of the information object 320b is smaller (narrower) than the width 310W of the reference object 310. For instance, the width along the Y-axis direction of the information object 320b is made smaller than the width along the Y-axis direction of the reference object 310.

Thus, the image data generation section 130 performs the following based on the reference body distance 310L between the position of the user 100 and the position of the reference body 810, and the target distance 320L between the position of the user 100 and the target position 820.

As shown in FIG. 3 (and FIG. 1B), when the target distance 320L is shorter than the reference body distance 310L (when in the first state ST1), the image data generation section 130 makes the size of the information object 320 larger than the size of the reference object 310 in the image 301.

As shown in FIG. 3 (and FIG. 1C), when the target distance 320L is longer than the reference body distance 310L (when in the second state ST2), the image data generation section 130 makes the size of the information object 320 smaller than the size of the reference object 310 in the image 301.

This makes it possible to provide a monocular head mounted display with clarity of the depth of the display image (the relationship between the depth position of the perceived display image and the depth of the real scene 801).

That is, the reference object 310 is displayed in superimposition on the reference body 810 serving as a reference of the depth. The relative relationship between the size of the information object 320 and the size of the reference object

310 is changed. Thus, the perceived depth position of the information object 320 can be controlled with high accuracy.

According to experiments by the inventor, in the case of the background (real scene 801) free from anything (any body) superimposed on the display image, the size of the information object 320 was changed. Then, it was found that some subjects perceived that the depth position of the information object 320 changed, and some subjects perceived that the size of the information object 320 changed without changing its depth position. It depends on the subjects whether perceiving that the depth position has changed or perceiving that the size of the information object 320 has changed. That is, in the case where the background (real scene 801) is free from anything superimposed on (intersecting with) the display image, the perceived depth position depends on the individuals.

In the case of viewing an image with both eyes, the depth information can be obtained by e.g. binocular parallax. However, in the case of viewing with one eye, because of no binocular parallax, no depth information is obtained. Thus, when information objects 320 different in size are viewed, it is indefinite whether the information objects 320 are perceived as being different in depth or in size.

On the other hand, according to experiments by the inventor, an image was displayed in superimposition on the wall of e.g. a building located on the ground as viewed from the subject. Then, it was found that it was easier for the subject to perceive the depth position of the image as being located on the wall. That is, the image displayed in superimposition on the wall of e.g. a building serves as a reference for the depth. This image constitutes the reference object 310.

Thus, in the case where the background is free from anything superimposed on the display image, the perceived depth position depends on the individuals. However, in the case where the background includes something superimposed on the display image, its location is recognized as the depth position of the display image. In particular, if the display image is superimposed on a solid body 809 such as a wall, the position of the solid body 809 is likely to be recognized as the depth position of the display image.

Furthermore, according to experiments by the inventor, in conjunction with the reference image (reference object 310) displayed in superimposition on the wall of e.g. a building, another image (information object 320) was displayed. Then, it was found that the perceived depth of the image changed with the relative relationship between the size of the image and the size of the reference image. That is, it has turned out that if images different in size are displayed with the reference image, the images are not perceived as having changed in size, but are likely to be perceived as having changed in depth position.

Thus, if a reference image (reference object 310) is displayed in superimposition on the wall of e.g. a building located on the ground, the depth position of the reference image is likely to be fixed. Furthermore, by changing the relative relationship with the size of the reference image (reference object 310) displayed in superimposition on the wall, the perceived depth (instead of size) of the image (information object 320) is changed.

This phenomenon has not been known so far. Furthermore, there has been no implementation of display based on such a special phenomenon in monocular vision.

The monocular head mounted display 10 according to the embodiment is based on the aforementioned phenomenon discovered by the original experiments conducted by the inventor. This makes it possible to provide a monocular head mounted display with clarity of the depth of the display image.

Thus, in the embodiment, the newly discovered phenomenon described above is applied to realize AR (augmented reality) display with clarity of the depth position of the displayed object.

The size of the reference object 310 and the size of the information object 320 can be set based on e.g. the law of perspective.

For instance, the ratio of the size (e.g., the width along the X-axis direction) of the information object 320 to the size (e.g., the width along the X-axis direction) of the reference object 310 is set substantially equal to the ratio of the target distance 320L (the distance between the position of the user 100 and the target position 820) to the reference body distance 310L (the distance between the position of the user 100 and the position of the reference body 810).

However, these ratios may not be exactly equal. That is, it may be practically sufficient if the user 100 can grasp whether the target position 820 (e.g., the position of the intersection for change of traveling direction) is nearer or farther than the reference body 810.

Thus, when the target distance 320L is shorter than the reference body distance 310L, the size of the information object 320 is made larger than the size of the reference object 310. When the target distance 320L is longer than the reference body distance 310L, the size of the information object 320 is made smaller than the size of the reference object 310. Then, the practical depth can be grasped.

For instance, the ratio of the ratio of the width along the X-axis direction of the information object 320 to the width along the X-axis direction of the reference object 310 to the ratio of the target distance 320L to the reference body distance 310L is set to e.g. approximately 0.2 or more and 5 or less.

Figure 4:
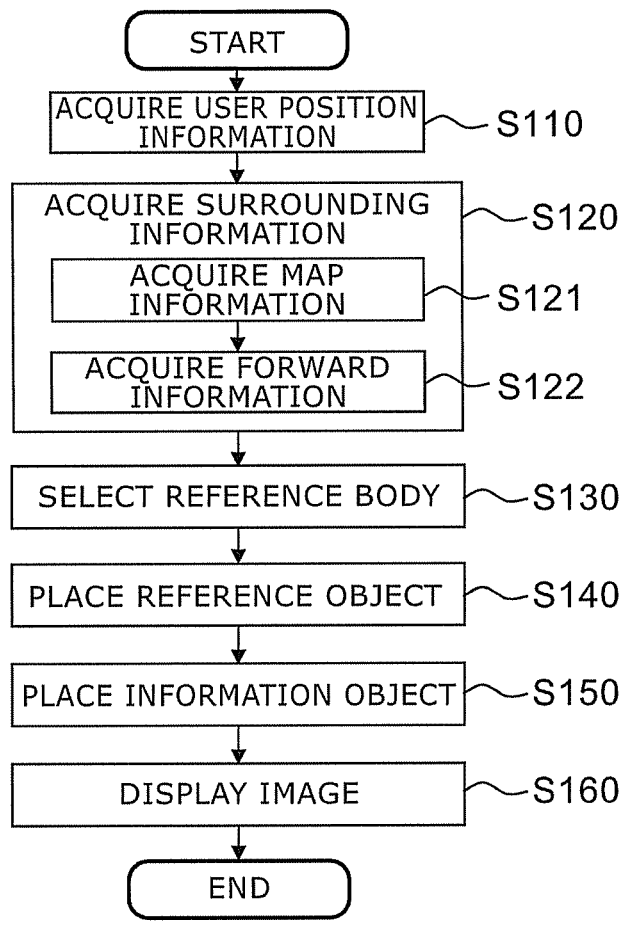
FIG. 4 is a flow chart illustrating the operation of the monocular head mounted display according to the first embodiment.

FIG. 4 is a flow chart illustrating the operation of the monocular head mounted display according to the first embodiment.

As shown in FIG. 4, in the monocular head mounted display 10, information on the position of the user 100 (user position information) is acquired (step S110). This operation is performed by the user position acquisition section 140.

Furthermore, surrounding information is acquired (step S120). For instance, map information around the user 100 is acquired (step S121). For instance, information on the situation ahead of the user 100 is acquired (step S122). For instance, three-dimensional picture information included in the map information is acquired based on the information on the position of the user 100. Furthermore, the surroundings (e.g., front) of the user 100 are imaged, and this imaging data is acquired. Thus, information on e.g. a plurality of solid bodies 809 located on the ground around the user 100 can be acquired.

Then, based on the information on e.g. a plurality of solid bodies 809, a reference body 810 serving as a reference for the depth as viewed from the user 100 is selected from among the plurality of solid bodies 809 located on the ground around the user 100 (step S130). Then, solid body position information (e.g., the positional relationship and distance between the reference body 810 and the user 100) on the position of the solid body 809 (reference body 810) is acquired. The operation of step S120 and step S130 is performed by e.g. the information acquisition section 170 (specifically, e.g., the solid body position acquisition section 150).

In the embodiment, as a reference body 810 serving as a reference for the depth, a body whose depth in the background real space is easy to estimate is used. For instance, a solid body 809 in the real space superimposed on the display region displayed by the monocular head mounted display 10 is used as a reference body 810. Among the plurality of solid bodies 809, in particular, it is preferable to use e.g. the wall of a building as a reference body 810. The depth position of e.g. the wall of a building is easy to estimate. Thus, by using the wall of a building as a reference body 810, the perceived position of the depth as viewed from the user 100 is stabilized.

For instance, from the acquired (or stored) map information and the position information of the user 100, a plurality of solid bodies 809 are selected as candidates for the reference body 810 for the depth. The solid bodies 809 are e.g. structures such as buildings. From among the plurality of solid bodies 809, a reference body 810 is selected. For instance, forward information of the user 100 is acquired by an imaging section (such as an external camera). Alternatively, three-dimensional picture information included in the map information is acquired, and forward information of the user 100 is acquired. Based on the forward information obtained by e.g. these methods, from among the selected candidates (solid bodies 809), the properties (such as position, distance, texture, and size) of the solid bodies 809 are comprehensively examined to determine a reference body 810 for the depth.

Then, a reference object 310 is placed in the image 301 in superimposition on the position of the reference body 810 as viewed from the user 100 (step S140). This operation is performed by e.g. the image data generation section 130.

More specifically, based on the position of the head 105 of the user 100 (the position of the image display section 110), the position of the reference object 310 in the image 301 is determined so that the reference object 310 is superimposed on the reference body 810 as viewed from the position of one eye 101 of the user 100.

Then, based on the surrounding information and the position of the user 100 acquired by the user position acquisition section, an information object 320 is placed in the image 301 in superimposition on the target position 820 of the real scene 801 (step S150).

More specifically, based on the position of the head 105 of the user 100 (the position of the image display section 110), the position of the information object 320 in the image 301 is determined so that the information object 320 is superimposed on the target position 820 as viewed from the position of one eye 101 of the user 100.

Then, image data including the reference object 310 and the information object 320 is generated. This operation is performed by e.g. the image data generation section 130.

An image is displayed based on the image data (step S160). This operation is performed by e.g. the image display section 110.

Thus, display with clarity of the depth of the display image can be implemented.

Here, as shown in FIG. 1A, the reference object 310 may be placed (step S140), and the image may be displayed based on the image data (step S160). That is, for a prescribed time, the reference object 310 may be displayed without displaying the information object 320. Then, after the lapse of the prescribed time, as illustrated in FIG. 1B or 1C, the information object 320 may be displayed with the reference object 310.

If the texture of the reference body 810 serving as a reference for the depth is complicated, the reference object 310 is made less visible when the reference object 310 is superimposed on the reference body 810. Thus, it is preferable to select a reference body 810 with simple texture.

For instance, the surrounding information acquired by the information acquisition section 170 (e.g., solid body position acquisition section 150) can include image information of each of the plurality of solid bodies 809. Based on the image information of each of the plurality of solid bodies 809, the information acquisition section 170 determines the texture of each of the plurality of solid bodies 809. Then, from among the plurality of solid bodies 809, the information acquisition section 170 selects a solid body 809 having a relatively uniform texture as a reference body 810. As the uniformity of the texture, for instance, the brightness variation of the image of the solid body 809 can be used.

For instance, based on the image information of each of the plurality of solid bodies 809, the information acquisition section 170 calculates brightness variation included in the image information of each of the plurality of solid bodies 809. Then, from among the plurality of solid bodies 809, the information acquisition section 170 selects a solid body 809 with the calculated brightness variation being small as a reference body 810. That is, as a relatively uniform texture, for instance, a texture with relatively small brightness variation can be used.

Thus, the solid body 809 with simple texture is selected as a reference body 810. This improves the visibility of the reference object 310 displayed in superimposition on the reference body 810.

In selecting the reference body 810, if the distance between the user 100 and the reference body 810 is excessively large, the depth position of the reference body 810 is unclear. As a result, the depth position of the reference object 310 is made unclear. Thus, in the embodiment, among the solid bodies 809, a solid body 809 with the distance between the user 100 and the reference body 810 being equal to or less than a predetermined value is preferably selected as a reference body 810.

For instance, the distance between the position of the user 100 and the position of the reference body 810 is set to e.g. 200 meters (m) or less. More preferably, the distance between the position of the user 100 and the position of the reference body 810 is e.g. 100 m or less.

That is, the selecting of the reference body 810 by the information acquisition section 170 can include selecting the reference body 810 so that the distance between the position of the reference body 810 and the position of the user 100 is equal to or less than a predetermined length.

Here, the distance between the user 100 and the reference body 810 (the predetermined distance) can be changed depending on the moving speed of the user 100 (e.g., the speed of the vehicle 730). For instance, the distance between the user 100 and the reference body 810 for the vehicle 730 at high speed is set longer than the distance between the user 100 and the reference body 810 for the vehicle 730 at low speed.

The information acquisition section 170 can derive the distance between the position of the reference body 810 and the position of the user 100 based on the surrounding information acquired by the information acquisition section 170 and the position of the user 100.

Furthermore, the information acquisition section 170 can derive the distance between the position of the reference body 810 and the position of the user 100 based on the surrounding information acquired by the information acquisition section 170 (e.g., imaging data and distance measurement data).

FIGS. 5A to 5D are schematic views illustrating the operation of the monocular head mounted display according to the first embodiment.

Figure 5A:
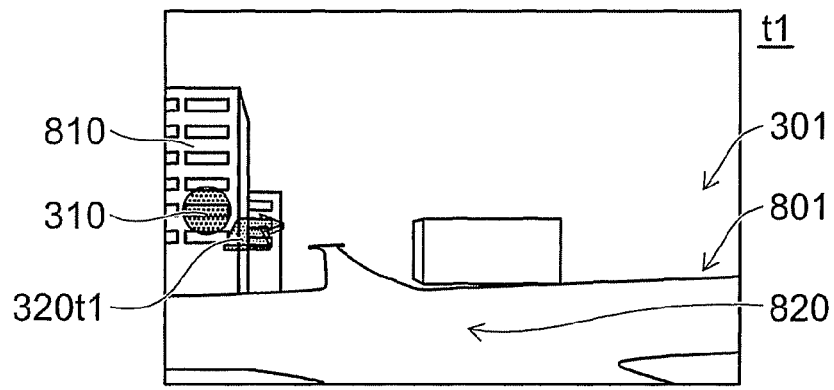
FIGS. 5A to 5D are schematic views illustrating the operation of the monocular head mounted display according to the first embodiment.
Figure 5B:
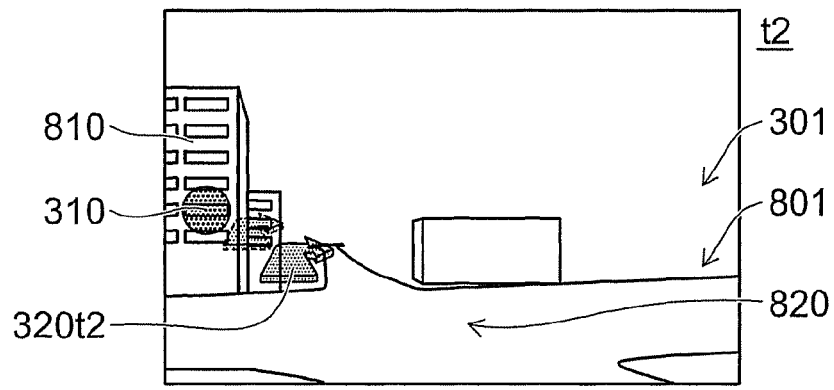
Figure 5C:
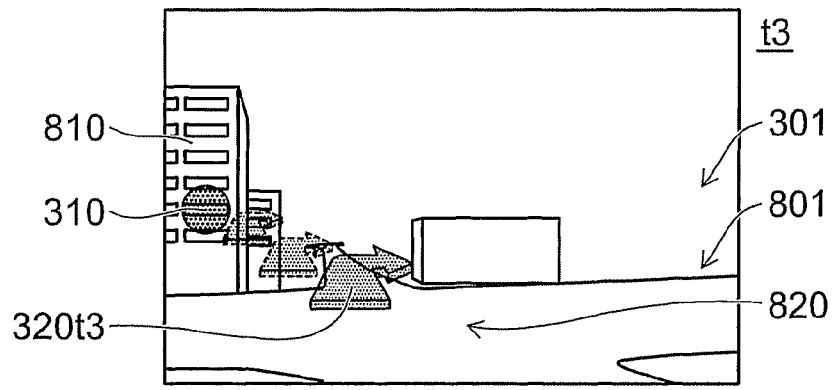
Figure 5D:
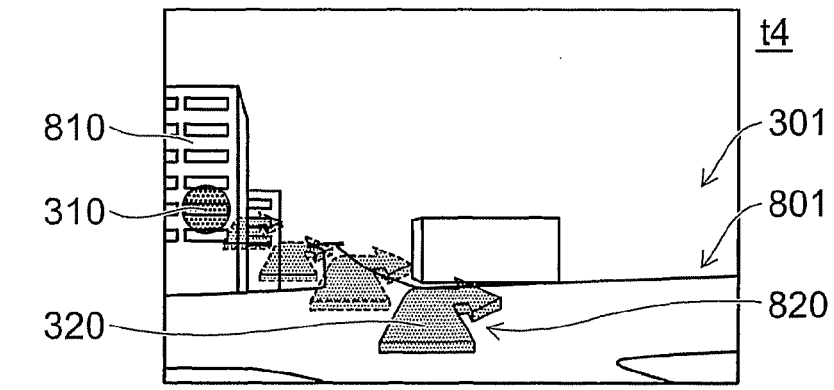

These figures show an example of the operation of the monocular head mounted display 10 in the first state ST1 in which the target position 820 is nearer than the reference body 810 as viewed from the user 100. FIG. 5A shows a display state at a time (time t1). FIG. 5B shows a display state at time t2 later than FIG. 5A. FIG. 5C shows a display state at time t3 later than FIG. 5B. FIG. 5D shows a display state at time t4 later than FIG. 5C.

As shown in FIG. 5D, at time t4, the information object 320 is placed in the image 301 in superimposition on the target position 820 as viewed from the user 100.

As shown in FIGS. 5A to 5C, at times t1-t3 before time t4, intermediate information objects 320t1-320t3 are displayed. The intermediate information objects 320t1-320t3 are displayed between the display position of the reference object 310 and the display position of the information object 320.

For instance, the information object 320 looks like moving from the position superimposed on the reference body 810 (the position of the reference object 310) to the position superimposed on the target position 820.

Furthermore, the display state of the intermediate information objects 320t1-320t3 can be changed. Then, it also looks as if another object is displayed between the position superimposed on the reference body 810 and the position superimposed on the target position 820, rather than the information object 320 is moving.

The size of the intermediate information objects 320t1-320t3 is preferably set so as to become larger from the position superimposed on the reference body 810 toward the position superimposed on the target position 820.

Thus, in placing the information object 320 in the image 301, the image data generation section 130 moves the information object 320 along the direction from the position in the image 301 superimposed on the position of the reference body 810 as viewed from the user 100 to the position in the image 301 superimposed on the target position 820 as viewed from the user 100. After this movement, the information object 320 is placed at the position in the image 301 superimposed on the target position 820 as viewed from the user 100.

Thus, based on the solid body position information and indication position information acquired by the information acquisition section 170, the image data generation section 130 generates image data in the following manner. That is, the information object 320 is placed in the image so that the information object 320 is superimposed on the solid body. Then, the information object 320 is moved in the image so that the information object 320 is superimposed on the indication position (e.g., target position 820).

Furthermore, in placing the information object 320 in the image 301, the image data generation section 130 can further generate data on intermediate information objects 320t1-320t3 placed along the line segment connecting between the position in the image 301 superimposed on the position of the reference body 810 as viewed from the user 100 and the position in the image 301 superimposed on the target position 820 as viewed from the user 100.

This further improves the clarity of the positional relationship between the information object 320 and the reference object 310.

The operation as described above can be performed also in the second state ST2.

FIGS. 6A to 6D are schematic views illustrating the operation of the monocular head mounted display according to the first embodiment.

These figures show an example of the operation in displaying the reference object 310. FIGS. 6A to 6D show display states at times t5-t8, respectively. Times t5-t8 occur chronologically in this order.

Figure 6A:
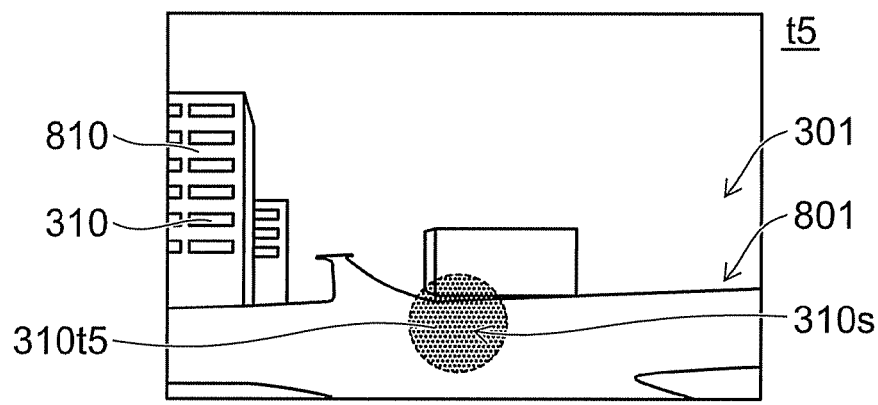
FIGS. 6A to 6D are schematic views illustrating the operation of the monocular head mounted display according to the first embodiment.
Figure 6B:
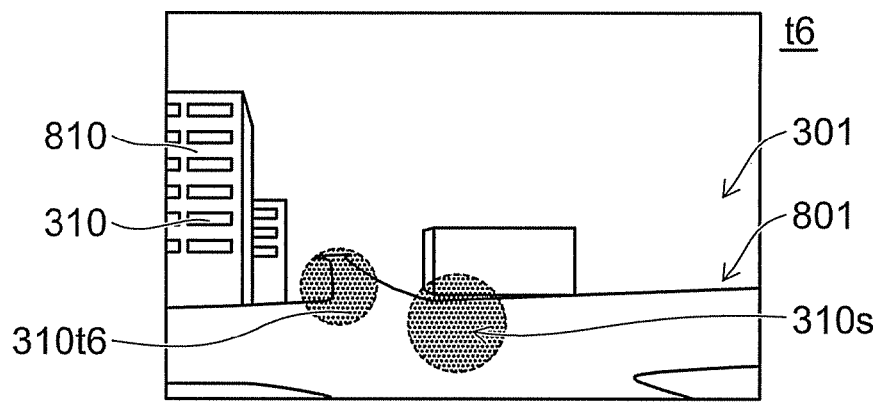
Figure 6C:
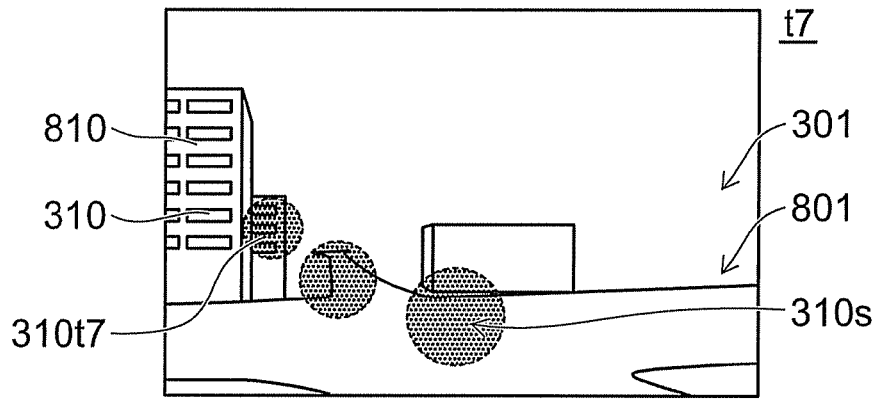
Figure 6D:
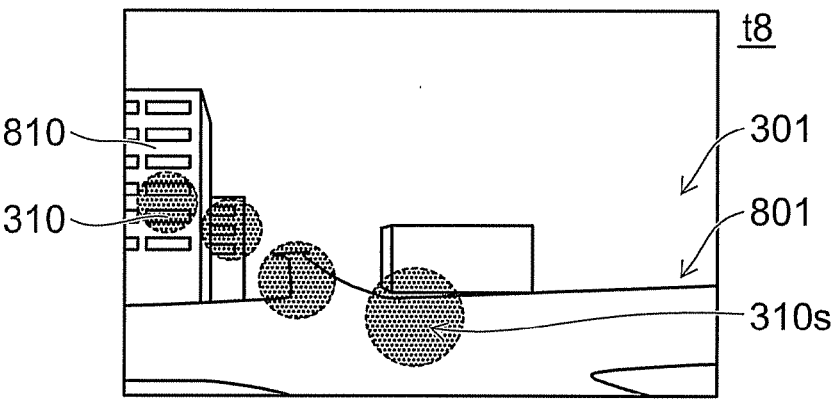

As shown in FIG. 6D, at time t8, the reference object 310 is placed in the image 301 in superimposition on the reference body 810 as viewed from the user 100.

As shown in FIGS. 6A to 6C, at times t5-t7 before time t8, intermediate reference objects 310t5-310t7 are displayed. The intermediate reference objects 310t5-310t7 are displayed between the display position of the reference object 310 and a specific start position 310s in the image 301.

The specific start position 310s in the image 301 corresponds to the position of the user 100 as viewed from the user 100. The start position 310s is placed in the lower portion in the image 301 and in the horizontal center portion in the image 301.

For instance, the reference object 310 looks like moving from the start position 310s to the position superimposed on the reference body 810 (the position where the reference object 310 is to be superimposed).

Furthermore, the display state of the intermediate reference objects 310t5-310t7 can be changed. Then, it also looks as if another object is displayed between the start position 310s and the position superimposed on the reference body 810, rather than the reference object 310 is moving.

The size of the intermediate reference objects 310t5-310t7 is preferably set so as to become smaller from the start position 310s toward the position superimposed on the reference body 810.

Thus, in placing the reference object 310 in the image 301, the image data generation section 130 moves the reference object 310 along the direction from the start position 310s in the image 301 toward the position in the image 301 superimposed on the position of the reference body 810 as viewed from the user 100. After this movement, the reference object 310 is placed at the position in the image 301 superimposed on the position of the reference body 810 as viewed from the user 100.

Furthermore, in placing the reference object 310 in the image 301, the image data generation section 130 further generates data on intermediate reference objects 310t5-310t7 placed along the line segment connecting between the start position 310s in the image 301 and the position in the image 301 superimposed on the position of the reference body 810 as viewed from the user 100.

Thus, the reference object 310 moves from the position in the image 301 superimposed on the position ahead of the user 100 (start position 310s) to the position in the image 301 superimposed on the reference body 810 (the display position of the reference object 310). Alternatively, between these locations, intermediate reference objects 310t5-310t7 corresponding to the reference object 310 are displayed.

Thus, the reference object 310 is displayed using dynamic perspective. This enables the depth distance of the reference object 310 to be recognized more accurately.

Accordingly, even in such cases where the reference position of the depth (the depth position of the reference body 810) is unclear, the depth distance of the reference object 310 can be recognized more accurately.

The operation as described above can be performed also in the second state ST2.

Second Embodiment

Figure 7:
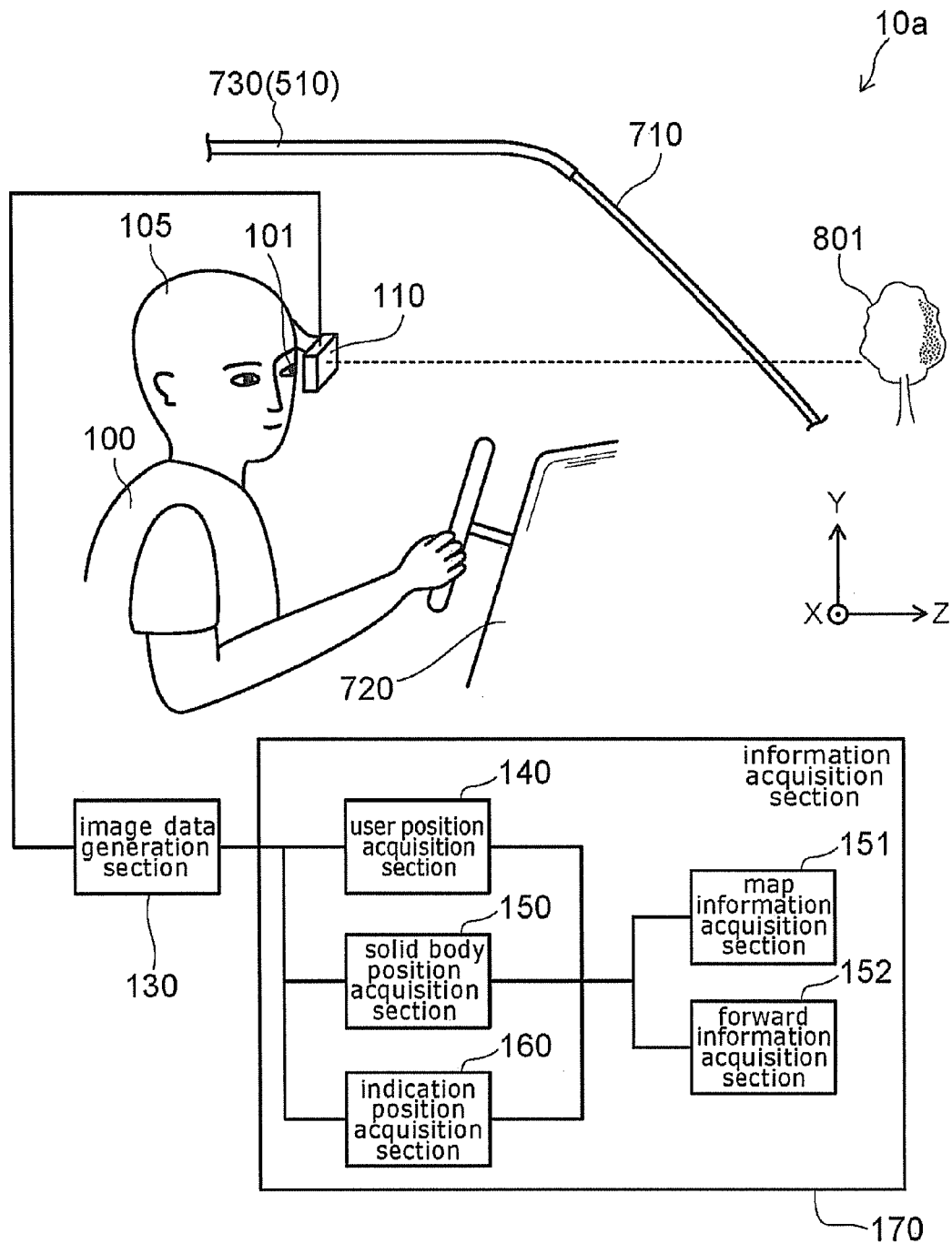
FIG. 7 is a schematic view illustrating the configuration of a monocular head mounted display according to a second embodiment.

FIG. 7 is a schematic view illustrating the configuration of a monocular head mounted display according to a second embodiment.

As shown in FIG. 7, in the monocular head mounted display 10a according to this embodiment, the information acquisition section 170 includes a map information acquisition section 151 and a forward information acquisition section 152.

The map information acquisition section 151 acquires map information around the user 100. The map information acquisition section 151 may include a storage section for storing map information. Then, the map information acquisition section 151 acquires map information by reading map information from this storage section. Alternatively, the map information acquisition section 151 acquires map information by an arbitrary communication method from outside the map information acquisition section 151.

The placing of the information object 320 includes, based on the acquired map information, placing the information object 320 in the image 301 in superimposition on the target position 820 (the position of the real scene 801 related to the provision information provided by the information object 320) as viewed from the user 100.

The forward information acquisition section 152 e.g. images the real scene 801 around the user 801. Based on the imaging data, the forward information acquisition section 152 acquires information around the user 100. Thus, information on solid bodies 809 is acquired.

The information acquisition section 170 acquires the imaging data on the real scene 801 around the user 801 as surrounding information. In this operation, the forward information acquisition section 152 is used. The selecting of a reference body 810 includes selecting based on this imaging data.

Here, for instance, in the case where the map information includes three-dimensional picture information around the user 100, the forward information acquisition section 152 is omitted.

The map information acquired by the map information acquisition section 151 is supplied to e.g. at least one of the user position acquisition section 140, the solid body position acquisition section 150, and the indication position acquisition section 160. The information acquired by the forward information acquisition section 152 is supplied to e.g. at least one of the user position acquisition section 140, the solid body position acquisition section 150, and the indication position acquisition section 160.

In this case, the information acquisition section 170 (solid body position acquisition section 150) acquires data on a plurality of solid bodies 809 associated with the map information on the region including the surroundings of the user 100. Then, the selecting of a reference body 810 includes selecting based on the data on the plurality of solid bodies 809 associated with the map information.

Third Embodiment

Figure 8:
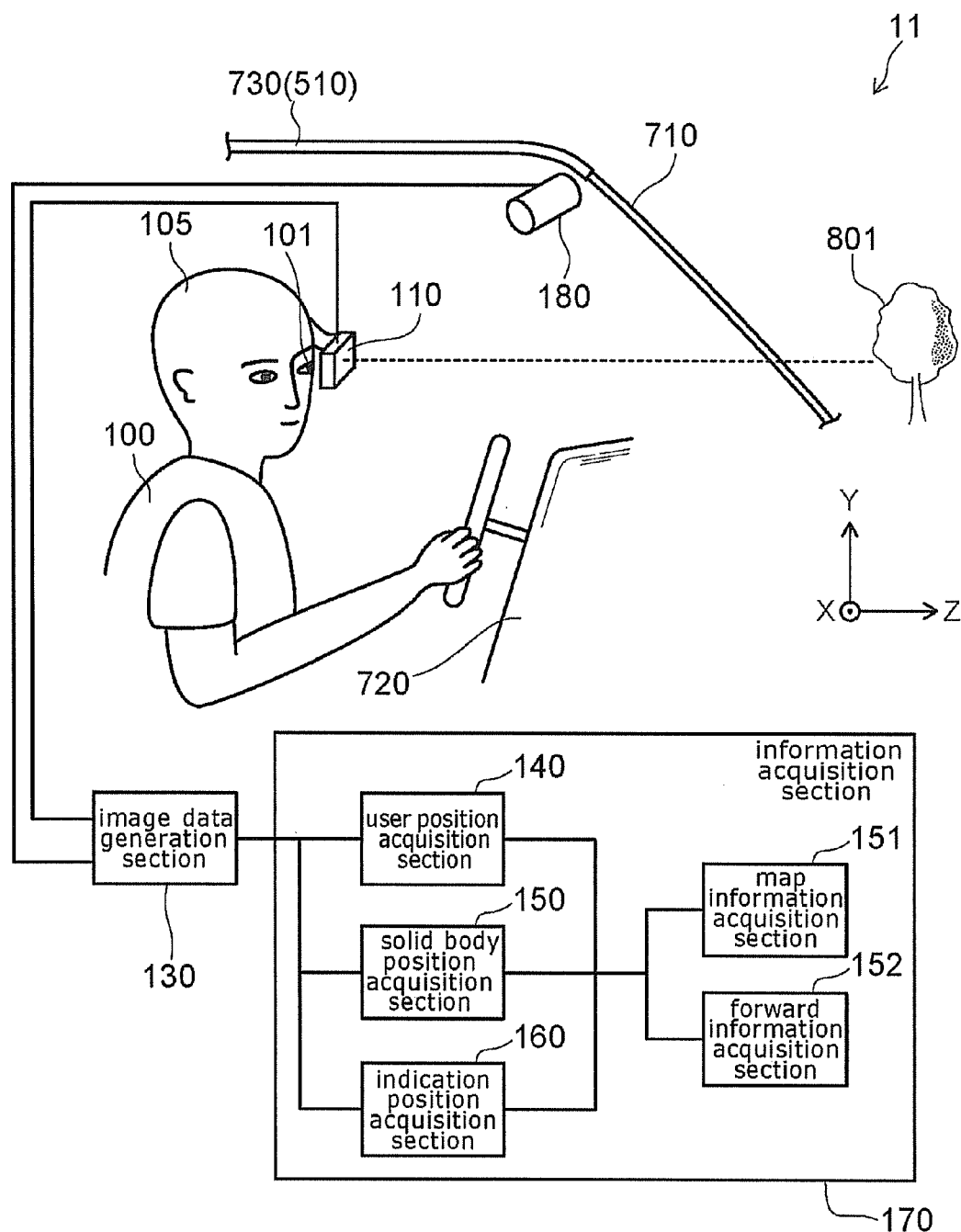
FIG. 8 is a schematic view illustrating the configuration of a monocular head mounted display according to a third embodiment.

FIG. 8 is a schematic view illustrating the configuration of a monocular head mounted display according to a third embodiment.

As shown in FIG. 8, the alternative monocular head mounted display 11 according to this embodiment further includes a detection section 180. The detection section 180 detects the position of the head 105 of the user 100 (e.g., the motion of the position of the head 105).

Depending on the motion (positional change) of the head 105 detected by the detection section 180, the image data generation section 130 corrects the position of the reference object 310 and the position of the information object 320 in the image 301.

Figure 9A:
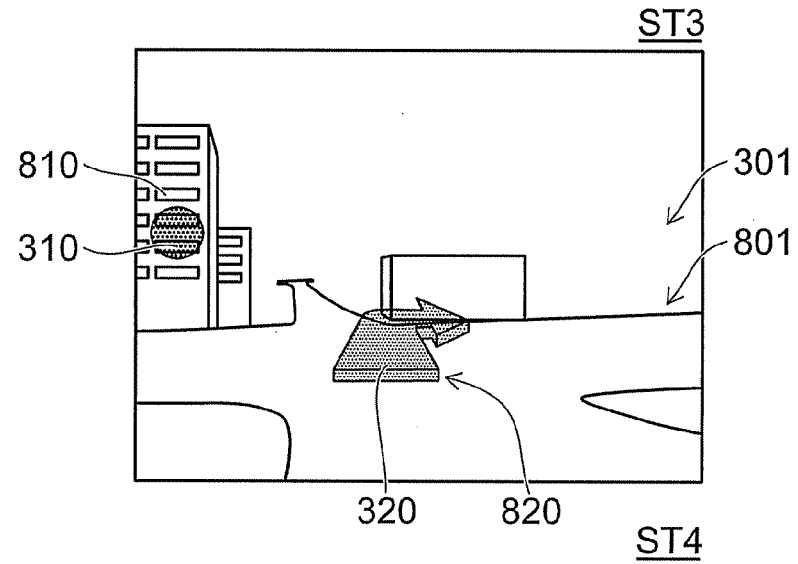
FIGS. 9A to 9C are schematic views illustrating the operation of the monocular head mounted display according to the third embodiment.
Figure 9B:
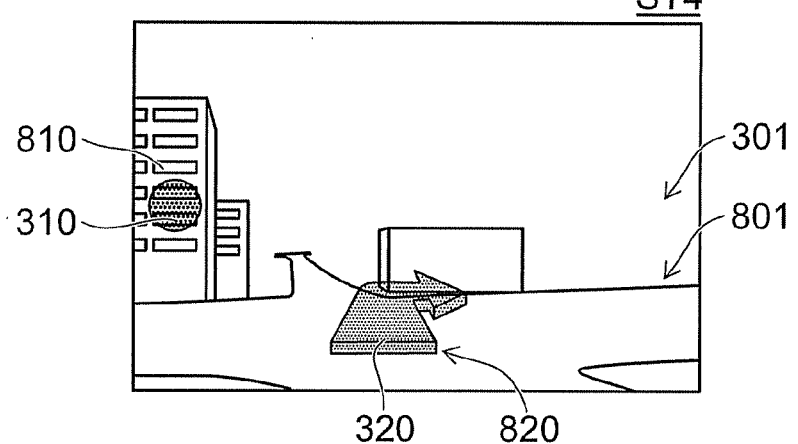
Figure 9C:
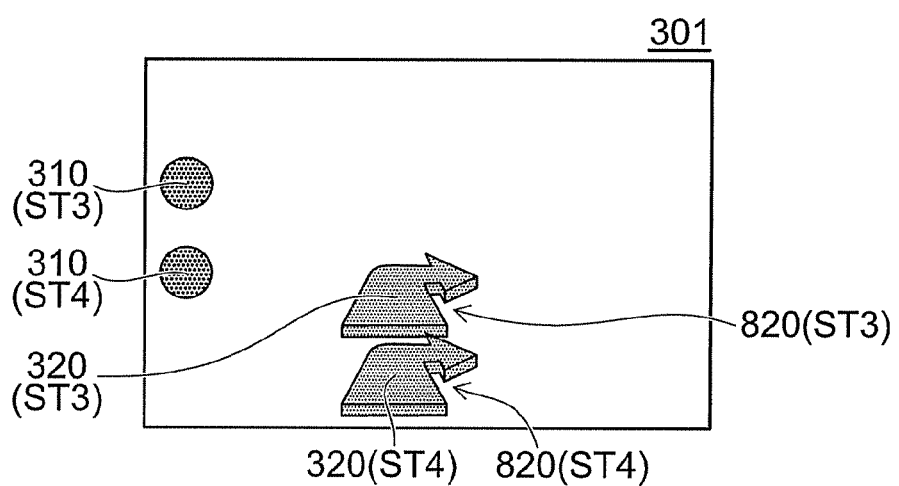

FIGS. 9A to 9C are schematic views illustrating the operation of the monocular head mounted display according to the third embodiment.

FIG. 9A shows an example of the image viewed by the user 100 in which the image 301 is superimposed on the real scene 801. FIG. 9B shows an example of the image in which the pitch angle of the user 100 is different from that in the state of FIG. 9A. The state of the pitch angle of FIG. 9A is defined as third state ST3. The state of the pitch angle of FIG. 9B is defined as fourth state ST4. FIG. 9C illustrates the image 301 in the third state ST3 and the image 301 in the fourth state ST4.

As shown in FIG. 9A, in the third state ST3, when the user 100 views the real scene 801, the user 100 perceives the target position 820 in e.g. the center portion of the image 301 (the center portion of the frame contouring the image 301).

As shown in FIG. 9B, in the fourth state ST4 different in pitch angle from the third state ST3, when the user 100 views the real scene 801, the user 100 perceives the target position 820 in e.g. the lower portion of the image 301.

Thus, for instance, if the pitch angle changes, the relative position of the real scene 801 superimposed on the image 301 is varied.

Here, as shown in FIG. 9C, depending on the change of the pitch angle, the position of the reference object 310 and the position of the information object 320 in the image 301 are moved.

Thus, as shown in FIGS. 9A and 9B, even when the pitch angle changes, the reference object 310 is superimposed on the position of the reference body 810, and the information object 320 is superimposed on the target position 820.

The foregoing describes the operation depending on the change of the pitch angle. However, the embodiment is not limited thereto. For instance, the display position may be controlled depending on the change of at least one of the pitch angle, yaw angle, and roll angle. For instance, when the positional change of the head 105 detected by the detection section 180 includes change along at least one direction of the pitch angle direction, yaw angle direction, and roll angle direction, the image data generation section 130 changes the position in the image 301 of the reference object 310 along the at least one direction, and changes the position in the image 301 of the information object 320 along the at least one direction.

That is, depending on the positional change of the head 105 detected by the detection section 180, the image data generation section 130 corrects the position in the image 301 of the reference object 310 and the position in the image 301 of the information object 320 so that the reference object 310 is superimposed on the position of the reference body 810 and that the information object 320 is superimposed on the target position 820.

For instance, in the first state ST1, the amount of positional change in the image 301 of the information object 320 is made larger than the amount of positional change in the image 301 of the reference object 310. In the second state ST2, the amount of positional change in the image 301 of the information object 320 is made smaller than the amount of positional change in the image 301 of the reference object 310.

The above operation improves the clarity of the depth of the display image even in the case where the position of the head 105 changes.

In particular, in the case where the pitch angle changes, the relationship between the display image (e.g., reference object 310 and information object 320) and the real scene 801 is mismatched vertically. In the case of vertical mismatch, it is difficult to see whether the depth direction of the display image (e.g., reference object 310 and information object 320) has changed, or its height from the ground has changed. In contrast, as described above, by correcting the position of the display image depending on the pitch angle, the depth of the display image is made clear.

For instance, the above correction is performed in the placing of the reference object 310 (step S140) in the operation described with reference to FIG. 4. Furthermore, the above correction is performed in the placing of the information object 320 (step S150).

For instance, a reference value is previously determined with regard to the amount of positional movement of the head 105. For instance, the above correction is performed in the case where the amount of positional movement of the head 105 actually detected by the detection section 180 exceeds the reference value. This improves the efficiency of data processing.

In the embodiment, the reference object 310 serving as a reference for the depth is displayed in the picture. By causing its depth position to be recognized, the depth position can be recognized even if the information object 320 is displayed in the background where there is no clue to the depth.

The clue to the depth in this case is the size of the display item based on the law of perspective. In particular, the information object 320 is moved from the position of the reference object 310 using dynamic perspective, and its trajectory is caused to be recognized. This improves the clarity of the depth position of the information object 320.

Furthermore, by changing the display position depending on the motion of the head 105 of the user 100, the reference object 310 and the information object 320 can be superimposed on desired positions in the background. Thus, even if the head 105 of the user 100 moves e.g. vertically, the perceived depth position does not change.

The embodiment is suitable for application to the route guidance (navigation) of e.g. the vehicle 730. In the case of application to navigation, in the display of the information object 320, the information object 320 having a shape based on navigation information is generated. Here, the section for generating navigation routes may be incorporated in the monocular head mounted display, or may be provided separately from the monocular head mounted display.

Figure 10:
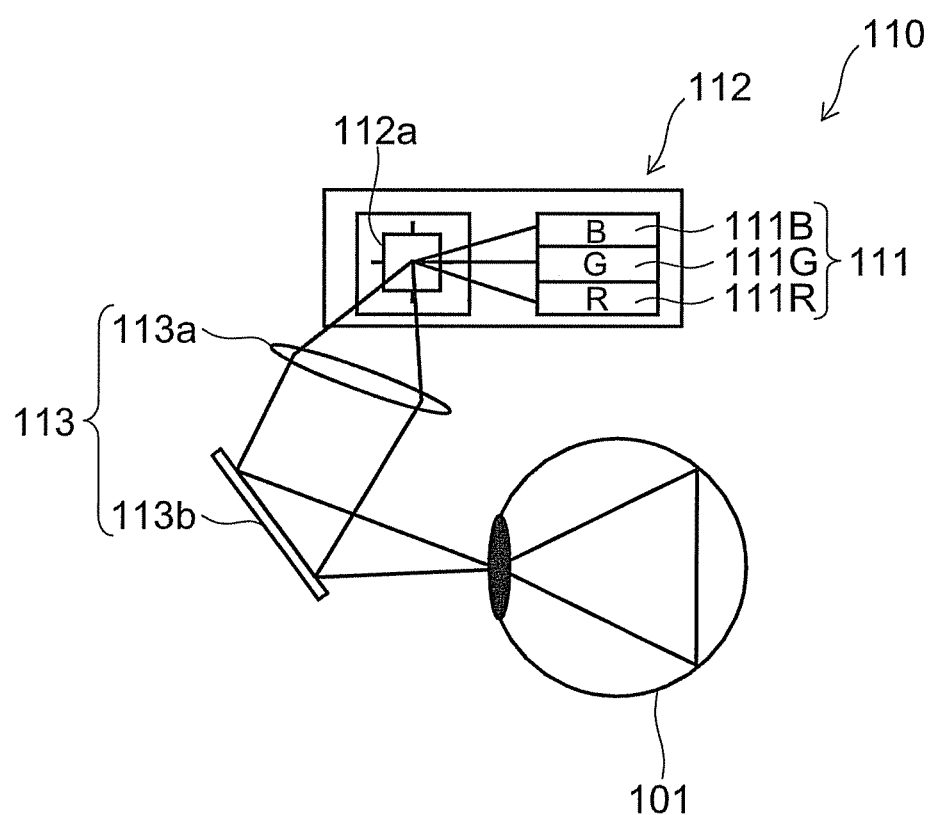
FIG. 10 is a schematic view illustrating the configuration of part of the monocular head mounted display according to the embodiments.

FIG. 10 is a schematic view illustrating the configuration of part of the monocular head mounted display according to the embodiments.

More specifically, this figure shows an example of the image display section 110 used in the monocular head mounted display according to the above first to third embodiments. In this example, a retinal scanning display of the laser scanning type is used as the image display section 110.

As shown in FIG. 10, the image display section 110 includes an image engine 112 and an optical component 113. In this example, the image engine 112 includes a light source 111 (blue light source 111B, green light source 111G, and red light source 111R) and an optical switch 112*a*. In this example, the optical component 113 includes an ocular optical system 113*a* and a combiner 113*b*.

For the blue light source 111B, the green light source 111G, and the red light source 111R, a blue laser, a green laser, and a red laser are used, respectively. For the optical switch 112*a*, for instance, a MEMS (microelectromechanical system) scanner is used.

From the light source 111, light with the brightness adjusted in accordance with a picture signal is outputted. The light outputted from the light source 111 is incident on the reflection surface of the MEMS device. The MEMS scanner changes the direction of the incident light. The light reflected by the MEMS scanner is scanned along the horizontal and vertical direction. Thus, an image is formed.

The optical component 113 is provided between the MEMS scanner and the user 100 on the optical path of the light. The optical component 113 causes the scanned light to be incident on one eye 101 of the user 100. In this example, the ocular optical system 113*a* is provided between the MEMS scanner and the user 100, and the combiner 113*b* is provided between the ocular optical system 113*a* and the user 100. For the ocular optical system 113*a*, for instance, a relay optical system is used. The combiner 113*b* is placed in front of one eye 101 of the user 100.

The light emitted from the image engine 112 and including the image passes through the ocular optical system 113*a* and is incident on the combiner 113*b*. The light reflected by the combiner 113*b* is incident on one eye 101. This light causes a picture to be displayed on the retinal surface of one eye 101.

The combiner 113*b* preferably includes a reflective film for reflecting the light having the wavelength of the light emitted from the light source. Through the combiner 113*b*, the user 100 can view both the image of the real space and the picture displayed by the image display section 110. Thus, the picture is viewed in superimposition on the real space.

Here, the ocular optical system 113*a* may have the function of the combiner 113*b*, or the combiner 113*b* may have the function of the ocular optical system 113*a*. For instance, as the optical component 113, a combiner having optical power may be used.

For instance, the image engine 112 and the optical component 113 are integrated with each other. The image display section 110 can include a fixing section fixed to the head 105 of the user 100. Thus, the image display section 110 is fixed to the head 105 of the user 100.

According to the embodiments, a monocular head mounted display with clarity of the depth of the display image is provided.

The embodiments of the invention have been described above with reference to examples. However, the embodiments of the invention are not limited to these examples. For instance, various specific configurations of the components such as the image display section, image data generation section, information acquisition section, user position acquisition section, solid body position acquisition section, indication position acquisition section, and detection section included in the monocular head mounted display are encompassed within the scope of the invention as long as those skilled in the art can similarly practice the invention and achieve similar effects by suitably selecting such configurations from conventionally known ones.

Furthermore, any two or more components of the examples can be combined with each other as long as technically feasible. Such combinations are also encompassed within the scope of the invention as long as they fall within the spirit of the invention.

In addition, those skilled in the art can suitably modify and implement the monocular head mounted display described above in the embodiments of the invention. All the monocular head mounted displays thus modified are also encompassed within the scope of the invention as long as they fall within the spirit of the invention.

Furthermore, various modifications and alterations within the spirit of the invention will be readily apparent to those skilled in the art.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monocular head mounted display comprising:
an information acquisition section that acquires solid body position information on a position of a solid body located on ground around a user, and indication position information on an indication position for the user;
an image data generation section that generates image data including an information object to provide provision information to the user; and
an image display section that displays an image based on the image data generated by the image data generation section on one eye of the user in superimposition on a real scene,
wherein based on the solid body position information and the indication position information acquired by the information acquisition section, the image data generation section generates the image data so as to move the information object in the image so that the information object is superimposed on the indication position after placing the information object in the image so that the information object is superimposed on the solid body,
wherein the information object moves from the position of the solid body to a target position
wherein based on the solid body position information, the information acquisition section selects a reference body serving as a reference for depth as viewed from the user from among a plurality of solid bodies located on the ground around the user,
the image data generation section generates the image data so as to further include a reference object serving as a reference for the depth as viewed from the user, and
the image data generation section generates the image data so as to place the reference object in the image so that the reference object is superimposed on the reference body,
the information acquisition section further acquires user position information on a current position of the user, and
when target distance from the current position acquired by the information acquisition section to the target position is farther than reference body distance from the current position to a position of the reference body, the image data generation section makes size of the information object in the image smaller than size of the reference object, and
when the target distance is nearer than the reference body distance, the image data generation section makes the size of the information object in the image larger than the size of the reference object.

2. The display according to claim 1, wherein
the information object includes information on an expected direction of travel of the user, and
the target position is a position to change a traveling direction of the user.

3. The display according to claim 1, wherein
the information acquisition section acquires information on a forward real scene around the user, and
the information acquisition section acquires the solid body position information based on the acquired information on the real scene.

4. The display according to claim 1, wherein the image data generation section sets the size of the reference object and the size of the information object based on law of perspective.

5. The display according to claim 1, wherein the image data generation section sets ratio of the size of the information object to the size of the reference object to be equal to ratio of the target distance to the reference body distance.

6. The display according to claim 1, wherein the image data generation section sets ratio of ratio of the size of the information object to the size of the reference object to ratio of the target distance to the reference body distance to be equal to 0.2 or more and 5 or less.

7. The display according to claim 1, wherein the generating of the image data includes generating the image data so as to display the information object with the reference object after a time interval for displaying the reference object without displaying the information object.

8. The display according to claim 1, further comprising:
a detection section that detects a position of head of the user,
wherein depending on change of the position of the head detected by the detection section, the image data generation section corrects position in the image of the reference object and position in the image of the information object so that the reference object is superimposed on the position of the reference body and that the information object is superimposed on the target position.

9. The display according to claim 8, wherein when the change of the position of the head detected by the detection section includes change along at least one direction of pitch angle direction, yaw angle direction, and roll angle direction, the image data generation section changes the position in the image of the reference object along the at least one direction, and changes the position in the image of the information object along the at least one direction.

10. The display according to claim 1, further comprising:
a detection section that detects a position of head of the user,
the information acquisition section further acquires user position information on a current position of the user, and
when target distance from the current position acquired by the information acquisition section to the target position is farther than reference body distance from the current position to a position of the reference body, depending on change of the position of the head detected by the detection section, the image data generation section makes amount of change of the position in the image of the information object larger than amount of change of the position in the image of the reference object, and
when the target distance is nearer than reference body distance, depending on the change of the position of the head detected by the detection section, the image data generation section makes the amount of change of the position in the image of the information object smaller than the amount of change of the position in the image of the reference object.

11. The display according to claim 1, wherein the selecting of the reference body includes selecting the reference body so that distance between the position of the reference body and the position of the user is equal to or less than a predetermined length.

12. The display according to claim 11, wherein the predetermined length is 200 meters or less.

13. The display according to claim 1, wherein
the acquiring of the solid body position information by the information acquisition section includes acquiring image information of each of the plurality of solid bodies, and
the selecting of the reference body includes, based on the image information of each of the plurality of solid bodies, determining texture of each of the plurality of solid bodies, and selecting one of the plurality of solid bodies having a relatively uniform texture as the reference body.

14. The display according to claim 1, wherein in placing the information object in the image, the image data generation section further generates data on an intermediate information object placed along a line segment connecting between a position in the image superimposed on the position of the reference body as viewed from the user and a position in the image superimposed on the target position as viewed from the user.

15. The display according to claim 14, wherein the image data generation section sets size of the intermediate information object so as to become larger along a direction from the position in the image superimposed on the reference body toward the position in the image superimposed on the target position.

16. The display according to claim 1, wherein in placing the reference object in the, image, the image data generation section moves the reference object along a direction from a start position in the image toward a position in the image superimposed on the position of the reference body as viewed from the user.

17. The display according to claim 16, wherein the start position is placed in a lower portion in the image and in a horizontal center portion in the image.

18. The display according to claim 1, wherein in placing the reference object in the image, the image data generation section further generates data on an intermediate reference object placed along a line segment connecting between a start position in the image and a position in the image superimposed on the position of the reference body as viewed from the user.

19. A monocular head mounted display comprising:
an information acquisition section that acquires solid body position information on a position of a solid body located on ground around a user, and indication position information on an indication position for the user;
an image data generation section that generates image data including an information object to provide provision information to the user; and
an image display section that displays an image based on the image data generated by the image data generation section on one eye of the user in superimposition on a real scene,
wherein based on the solid body position information and the indication position information acquired by the information acquisition section, the image data generation section generates the image data so as to move the information object in the image so that the information object is superimposed on the indication position after placing the information object in the image so that the information object is superimposed on the solid body,
wherein the information object moves from the position of the solid body to a target position,
wherein
based on the solid body position information, the information acquisition section selects a reference body serving as a reference for depth as viewed from the user from among a plurality of solid bodies located on the ground around the user,
the image data generation section generates the image data so as to further include a reference object serving as a reference for the depth as viewed from the user,
the image data generation section generates the image data so as to place the reference object in the image so that the reference object is superimposed on the reference body,
the information acquisition section further acquires user position information on a current position of the user, and
the image data generation section changes a relative relationship between a size of the information object in the image and a size of the reference object based a relationship between target distance from the current position acquired by the information acquisition section to the target position and reference body distance from the current position to a position of the reference body.

* * * * *